US011410047B2

(12) United States Patent
Ben Kimon et al.

(10) Patent No.: US 11,410,047 B2
(45) Date of Patent: Aug. 9, 2022

(54) TRANSACTION ANOMALY DETECTION USING ARTIFICIAL INTELLIGENCE TECHNIQUES

(71) Applicant: PAYPAL, INC., San Jose, CA (US)

(72) Inventors: Liron Florens Ben Kimon, Ofaqim (IL); Michael Dymshits, Holit (IL); Albert Zelmanovitch, Tel Aviv (IL); Dan Ayash, Tel Aviv (IL)

(73) Assignee: PAYPAL, INC., San Jose, CA (US)

( * ) Notice: Subject to any disclaimer, the term of this patent is extended or adjusted under 35 U.S.C. 154(b) by 874 days.

(21) Appl. No.: 16/237,114

(22) Filed: Dec. 31, 2018

(65) Prior Publication Data

US 2020/0210849 A1    Jul. 2, 2020

(51) Int. Cl.
*G06N 3/08* (2006.01)
*G06Q 20/38* (2012.01)

(52) U.S. Cl.
CPC ............. *G06N 3/088* (2013.01); *G06N 3/084* (2013.01); *G06Q 20/38* (2013.01)

(58) Field of Classification Search
None
See application file for complete search history.

(56) References Cited

U.S. PATENT DOCUMENTS 9,336,315 B2    5/2016  Ovsjanikovs et al.
11,170,375 B1 *  11/2021  Kramme ............. G06Q 20/407
2012/0290950 A1   11/2012  Rapaport et al.
2014/0079297 A1    3/2014  Tadayon et al.
2014/0344718 A1   11/2014  Rapaport et al.
2015/0254555 A1    9/2015  Williams, Jr. et al.
2018/0218261 A1    8/2018  Myara et al.

OTHER PUBLICATIONS

Tom Sweers, Autoencoding Credit Card Fraud, Radboud University, 2018; Total pp. 20 (Year: 2018).*
Lee et al., Detecting Online Game Chargeback Fraud Based on Transaction Sequence Modeling Using Recurrent Neural Network, Springer International Publishing AG, part of Springer Nature 2018 B. B. Kang and T. Kim (Eds.): WISA 2017, LNCS 10763, pp. 297-309, 2018. (Year: 2018).*
Vincent et al., Extracting and Composing Robust Features with Denoising Autoencoders, Proceedings of the 25 th International Conference on Machine Learning, Helsinki, Finland, 2008; pp. 1096-1103 (Year: 2008).*

(Continued)

*Primary Examiner* — Alan Chen
(74) *Attorney, Agent, or Firm* — Haynes and Boone, LLP

(57) ABSTRACT

Systems and methods for anomaly detection includes accessing first data comprising a plurality of historical reversion transactions. A plurality of legitimate transactions are determined from the plurality of historical reversion transactions. An autoencoder is trained using the plurality of legitimate transactions to generate a trained autoencoder capable of measuring a given transaction for similarity to the plurality of legitimate transactions. A first reconstructed transaction is generated by the trained autoencoder using a first transaction. The first transaction is determined to be anomalous based on a reconstruction difference between the first transaction and the first reconstructed transaction.

20 Claims, 10 Drawing Sheets

(56) References Cited

OTHER PUBLICATIONS

Sakurada et al., Anomaly Detection Using Autoencoders with Nonlinear Dimensionality Reduction, MLSDA '14, Dec. 2, 2014, Gold Coast, QLD, Australia; Total pp. 8 (Year: 2014).*
M.A. Al-Shabi, Credit Card Fraud Detection Using Autoencoder Model in Unbalanced Datasets, Journal of Advances in Mathematics and Computer Science 33(5): 1-16, 2019; Article No. JAMCS. 51106; pp. 1-16 (Year: 2019).*
Zamini et al., Credit Card Fraud Detection using autoencoder based clustering, 2018 9th International Symposium on Telecommunications (IST'2018), pp. 486-491 (Year: 2018).*
Pumsirirat et al., Credit Card Fraud Detection using Deep Learning based on Auto-Encoder and Restricted Boltzmann Machine, (IJACSA) International Journal of Advanced Computer Science and Applications, vol. 9, No. 1, 2018; pp. 18-25 (Year: 2018).*
Chen et al., Credit Card Fraud Detection Using Sparse Autoencoder and Generative Adversarial Network., IEEE 2018; pp. 1054-1059 (Year: 2018).*
International Application No. PCT/US2019/069007, International Preliminary Report on Patentability dated Jul. 15, 2021, 7 pages.
International Application No. PCT/US2019/069007, International Search Report and Written Opinion dated Mar. 31, 2020, 7 pages.
Axionable—Methodology for Fraud Detection in Credit Card Transactions With Small Manual Labelling Effort (Keras / MLP/ Autoencoder)—Axionable, 13 Pages, Axionable, https://www.axionable.com/fraud-detection-keras-mlp-autoencoder/.
Ian J. Goodfellow; Jean Pouget-Abadie; Mehdi Mirza; Bing Xu; David Warde-Farleu; Sherjil Ozair; Aaron Courville and Yoshua Bengio; "Generative Adversarial Nets," Jun. 10, 2014, 9 Pages, arXiv:1406.2661v1 [stat.ML], University of Montreal, Canada, http://www.github.com/goodfeli/adversarial.
Alireza Makhzani; Jonathon Shlens Navdeep Jaitly; Ian Goodfellow and Brendan Frey, "Adversarial Autoencoders," May 25, 2016, 16 Pages, arXiv:1511.05644v2 [cs.LG].
Panpan Zheng, Shuhan Yuan, Xintao Wu, Jun Li and Aidong Lu, "One-Class Adversarial Nets for Fraud Detection," Jun. 5, 2018, 10 Pages, arXiv:1803.01798v2 [cs.LG].
Credit Card Fraud Detection Using Autoencoders in Keras—TensorFlow for Hackers (Part VII), Aug. 6, 2018, 32 Pages, htpps://medium.com/@curiously/credit-card-fraud-detection-using-autoencoders-in-keras-tensorflow-for-hackers-part-vii-20e0c85301bd.
Rittick Banerjee, "Artificial Intelligence at the Changing Face of Payment Fraud," Aug. 6, 2018, 10 Pages, Finextra Research.
Yanfei Dong, "Data Augmentation in Transaction Classification Using a Neural Network," Filed on Dec. 27, 2018, U.S. Appl. No. 16/234,188, 32 Pages.

* cited by examiner

| Transaction ID 206 | Transaction Initiation Time 208 | 1st User (Payor) 202 | | 2nd Adjuster 204 | |
|---|---|---|---|---|---|
| | | Sub-Transaction Type 1 210 | Amount 1 212 | Sub-Transaction Type 2 214 | Amount 2 216 |
| 1 | 03/01/2018 | Payment | $30 | Refund | $30 |
| 2 | 11/03/2018 | Payment | $70 | Refund | $40 |

218→ (row 1)
220→ (row 2)

| Correlation Features 252 | Value 254 |
|---|---|
| Total Refund Times | 2 |
| Relationship Period | 8 months |
| Total Refund Amount | $70 |
| Refund Time Frequency | 0.25 times/month |

TRANSACTION ANOMALY DETECTION USING ARTIFICIAL INTELLIGENCE TECHNIQUES

BACKGROUND

Technical Field

The present disclosure generally relates to machine learning and artificial intelligence technology, and more particularly to transaction anomaly detection, according to various embodiments.

Related Art

In large sets of data, particularly relating to real-world events, a small sub-set of the data may indicate one or more unusual conditions or underlying real-world problems that may require remediation. However, such data may be relatively noisy—that is, it can be difficult to distinguish data for an ordinary (e.g. non-problematic) real-world event versus data for a problematic real-world event that may require that one or more additional actions be taken. Applicant recognizes that an improved system for detecting data anomalies in transactional data sets, particularly as they relate to real-world events, would be desirable, as such a detection system can improve computer system security and efficiency.

BRIEF DESCRIPTION OF THE FIGURES

FIG. 2A illustrates a table including combined transaction data associated with a user pair including users with different rights in accordance with an embodiment; FIG. 2B illustrates extracted correlation features of the combined transaction data of FIG. 2A in accordance with an embodiment;

Figure 1:
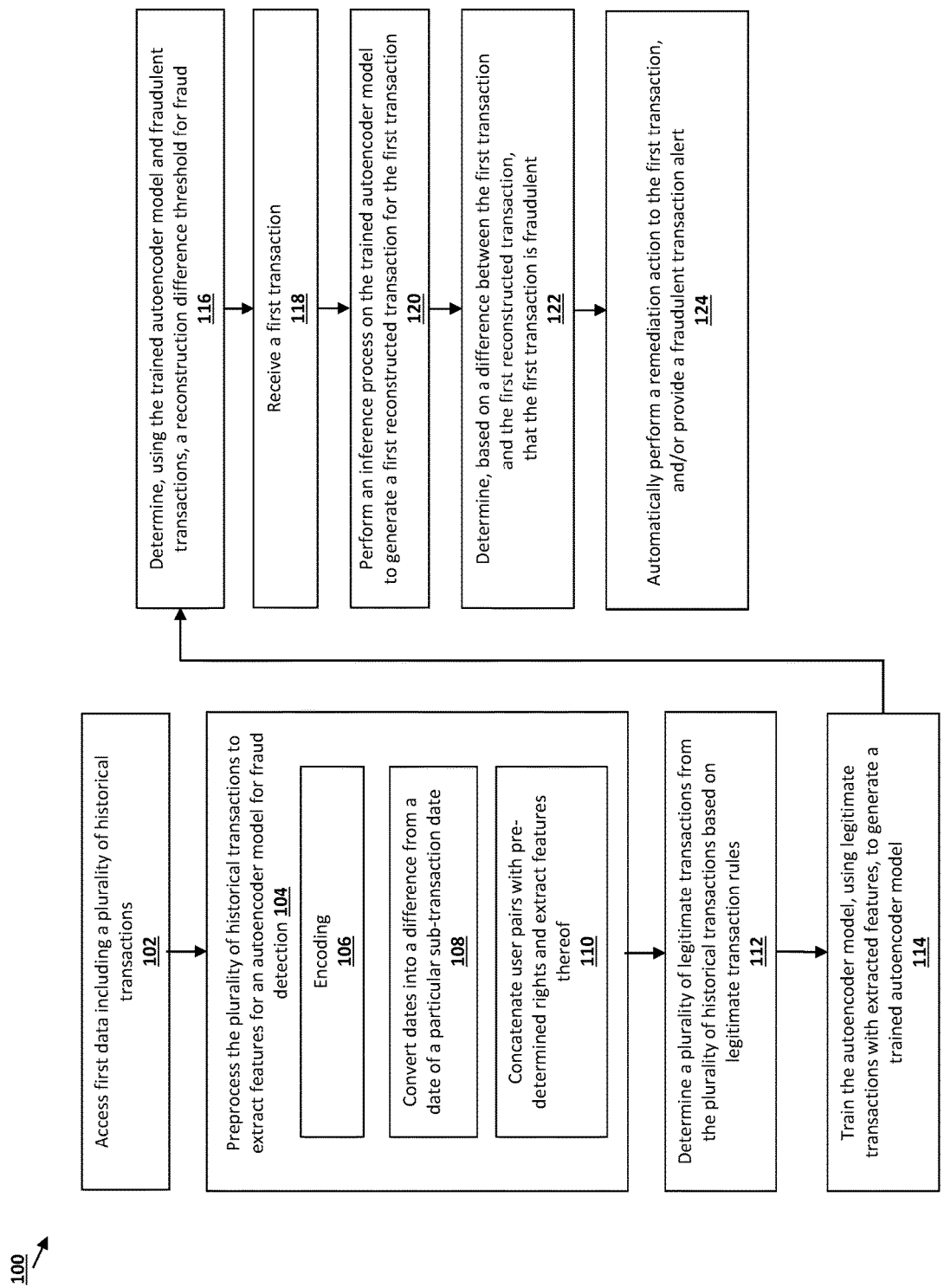
FIG. 1 is a flowchart illustrating a method for anomaly detection in accordance with an embodiment.
Figure 3:
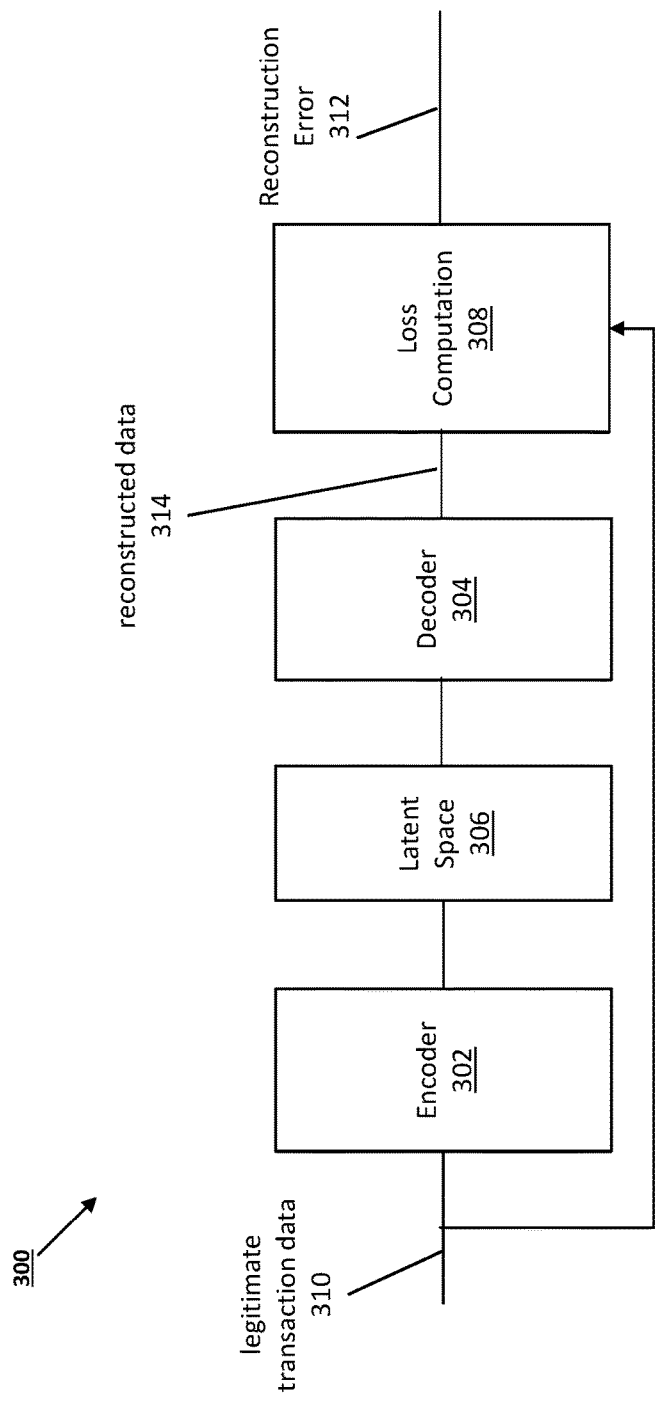
FIG. 3 is a schematic illustrating an anomaly detection system including an autoencoder for anomaly detection or a portion thereof in accordance with an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Using machine learning and artificial intelligence technology in anomaly detection systems presents various challenges. For example, training an artificial neural network (ANN) such as an auto-encoder based ANN for detection of particular events indicated in real-time data may require a training dataset including a large number of prior events that are labeled (e.g. indicative of a particular outcome of a past occurrence). Such a training dataset may include noise, e.g., prior events that are incorrectly labeled. Such noise may affect the accuracy of the detection systems using neural networks or other artificial intelligence techniques. Further, the training dataset may include incomplete event data which further affects the accuracy of the detection systems. Applicant recognizes that there is a need for improved accuracy and efficiency in detection systems based on real-time events. Accordingly, the present disclosure describes systems and methods for improved analytical techniques that relate to transaction anomaly detection in various embodiments, for example, for electronic payment transactions conducted through one or more computing devices.

More and more consumers are conducting electronic transactions, such as purchasing items and services, via computing devices over electronic networks such as, for example, the Internet. Consumers routinely purchase products and services from merchants and individuals alike. The transactions may take place directly between a physical or online merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why online and mobile purchases are growing very quickly.

Fraudulent transactions are a major problem with online payment service providers, however. As nefarious entities become more sophisticated, countermeasures for fraud also need to become more sophisticated. In order to deal with fraud, a payment service provider may sometimes reverse an electronic payment transaction that was fraudulent (e.g. remove currency from a receiver account and credit it back to a sender account), or may otherwise compensate a victim of fraud (e.g. posting an account credit). When large numbers of transactions are reversed or otherwise have a mitigating action taken (e.g. to combat fraud, correct for a merchant who did not deliver an item as promised, etc.), however, a secondary issue arises—the mitigation actions themselves are not always correct (e.g. it may be the case that a transaction reversal or account credit should not have actually been performed, because no underlying fraud actually occurred, or an underlying fraud was not sufficiently proved for the transaction to have been reversed in accordance with a payment service provider's terms of service, for example).

Accordingly, in a transaction system where transactions can be reversed and/or account credits may be issued, it would be desirable to be able to automatically detect when an incorrect transaction reversal or account credit was made. As used herein, the term "reversion transaction" refers to a transaction that results in a currency credit (or other compensation) being placed into one or more user accounts and that occurs with respect to another previous transaction (e.g. a buyer purchase from a seller). Thus, a reversion transaction can include a simple reversal of a prior transaction (seller's account is debited $5.00, purchaser's account is credited $5.00). A reversion transaction may also include a particular user account being credited without another user account in the previous transaction being debited (e.g. the payment processing entity, or another entity such as a credit card issuing bank, may make up the loss, rather than a sender of funds in a transaction). Thus, as used herein, the term "reversion transaction" does not refer to an initial purchase transaction between a buyer and seller (for example, a buyer simply selecting an item at a website in the course of ordinary shopping, then paying the seller via PayPal™ to complete the transaction would not be considered a reversion transaction).

Various challenges arise in training a neural network system for anomaly (e.g., fraudulent or otherwise incorrect reversion transactions) detection using different types of transaction data. In an example, a transaction may be associated with one or more users each having a different right (e.g., transaction initiation right, transaction modification right, transaction cancellation right, transaction reversion rights, etc.). In that example, transaction data associated with a transaction may include user activity data associated with each of the one or more users. In another example, the transaction data may include data collected at different times (e.g., transaction initialization time, transaction modification time, and transaction cancellation, etc.) by different devices (e.g., user devices, data loss prevention service provider devices, transaction service provider devices, other suitable third-party service provider devices, etc.) and/or stored at different databases, which may provide context into different activities of the one or more users. Stated another way, detecting an anomaly event using sophisticated computer machine learning algorithms can be difficult due to the nature of the underlying transactional data.

In various embodiments described below, systems and methods are described to improve the accuracy and efficiency of a neural network system for anomaly detection (note that these techniques are applicable to other machine learning models as well, in various embodiments). In a neural network system for anomaly detection (which can include fraud detection on reversion transactions), first data comprising a plurality of historical reversion transactions is accessed. A plurality of legitimate transactions are determined from the plurality of historical reversion transactions. An autoencoder is trained using the plurality of legitimate transactions to generate a trained autoencoder capable of measuring a given transaction for similarity to the plurality of legitimate transactions. A first reconstructed transaction is generated by the trained autoencoder using a first transaction. The first transaction is determined to be fraudulent based on a reconstruction difference between the first transaction and the first reconstructed transaction. By preprocessing the historical reversion transactions to extract features associated with the autoencoder model, accuracy for fraud detection is improved. Further, by using only the legitimate transactions for training the autoencoder and using a reconstruction difference generated by the trained autoencoder directly for anomaly detection, the computational cost is reduced. As such, the performance of the neural network for anomaly detection is improved. As noted above, in some cases, detection of an anomaly for a reversion transaction may indicate that the reversion transaction should not have been initiated (e.g. the reversion transaction may be fraud or an error on the part of the person who authorized it).

Referring to FIGS. 1, 2A, 2B, 3, 4, and 5, an embodiment of a method 100 for providing anomaly detection using a neural network system is illustrated. All or a portion of the operations referred to in FIGS. 1, 2A, 2B, 3, 4, 5, and elsewhere herein may be performed in various embodiments by any suitable computer system including system 800 as discussed in FIG. 8. Such a computer system may comprise multiple processors and/or server systems in some instances (e.g. a cloud cluster or other computer cluster).

The method may begin at block 102, where a system provider device accesses first data including a plurality of historical transactions. In various embodiments, the plurality of historical transactions may be provided by user devices and third-party service provider devices through a network. The historical transactions may include various types of historical transactions. In some examples, a historical transaction is an original transaction (e.g., an original purchase transaction, an original payment transaction, etc.). In other examples, a history transaction is a reversion transaction. Yet in some other examples, a historical transaction is a combined historical transaction that may include multiple sub-transactions (e.g., an original purchase transaction and a reversion transaction) performed by users of different rights. For example, a combined historical transaction may include a sub-transaction (e.g., an original transaction) for payment requested by a first user as a payor, and another sub-transaction (e.g., a reversion transaction) for refund performed by a second user as an adjuster to the historical transaction. At block 102, each of the historical transactions may have been labeled (e.g., as a legitimate transaction or a fraud transaction) or have not been labeled.

The method 100 may proceed to block 104, where the plurality of historical transactions are preprocessed to extract features associated with a neural network system including an autoencoder model for anomaly detection. In some embodiments, at block 104, an encoding process 106 is performed. In various embodiments, algorithms for the neural network system (e.g., machine learning) accept only numerical inputs, and therefore categorical variables of the historical transactions are encoded into numerical values using encoding techniques. Various encoding techniques, including for example, one hot encoding, ordinal encoding, sum encoding, Helmert encoding, polynomial encoding, backward difference encoding, binary encoding, any other suitable encoding techniques, and/or a combination thereof, may be used.

In some examples, at block 104, a conversion process 108 is performed. For example, a combined historical transaction for payment may include a first sub-transaction of an initial transaction for payment performed at a first date (e.g., May 1, 2018), and a second sub-transaction of a reversion transaction performed at a second date (e.g., Jun. 1, 2018). The conversion process 108 may convert the first date into a difference (e.g., 1 month) between the first date and the second date, which may be referred to as an extracted feature of a refund time period for that combined historical transaction.

Referring to FIGS. 2A and 2B, in some embodiments, at block 104, a combination process 110 is performed to combine associated historical transactions (e.g., an initial transaction and a reversion transaction performed by different users of different rights) to generate a combined historical transaction. Those associated historical transactions may be referred to as sub-transactions of the combined historical transaction. In some examples, the combination process 110 may also determine user information (e.g., name, past and current home/work addresses, birth date, education, employment experiences, relatives, social media account, etc.) of corresponding different users (e.g., payor, adjustor) of the sub-transactions, and generate the combined historical transaction including the user information of the different users of the sub-transactions.

The combination process 110 may extract features (e.g., correlation features associated with correlations of the sub-transactions) associated with the autoencoder for anomaly detection. Referring to the example of FIG. 2A, a combined historical transaction 218 is generated by combining a sub-transaction of an initial transaction performed by a first user (payor) 202 that has a transaction type 210 of "Payment" with an amount 212 of "$30," and a sub-transaction of a reversion transaction performed by a second user (adjuster) 204 that has a transaction type 214 of "Refund" with an amount 216 of "$30." Similarly, a combined historical transaction 220 is generated by combining a sub-transaction of an initial transaction performed by a first user (payor) 202 that has a transaction type 210 of "Payment" with an amount 212 of "$70," and a sub-transaction of a reversion transaction performed by a second user (adjuster) 204 that has a transaction type 214 of "Refund" with an amount 216 of "$40." (A Refund transaction may be reversion transaction, for example, while the "Payment" type of transaction in this example is not a reversion transaction.)

Referring to the example of FIG. 2B, the correlation features extracted from the combined historical transactions 218 and 220 are illustrated. As shown in FIG. 2B, the correction feature table 250 includes correction features 252 (e.g., "Total Refund Times," "Relationship Period," "Total Refund Amount," "Refund Frequency") with corresponding values 254 respectively (e.g., "2," "8 months," "$70," and "0.25 times/month"). These correction features may be used as features associated with anomaly detection by the autoencoder model.

Various correlation features 252 that are not illustrated in FIG. 2B may be extracted based on the autoencoder model for anomaly detection. In an example, a correlation feature may include a home address distance between the first user 202 and second user 204, using home addresses of those users provided by the combined historical transactions. In another example, a correlation feature may include a transaction location distance between the first user 202 and second user 204 when the sub-transactions were performed, using transaction locations provided by the combined historical transactions. In yet another example, a correlation feature may include a social media interaction frequency (e.g., six comments each week between two corresponding social media accounts), using social media accounts of those users provided by the combined historical transaction. Any other correlation features suitable for the autoencoder model for anomaly detection may be used.

The method 100 may proceed to block 112, where a plurality of legitimate transactions are determined (e.g., by an operator, by a system provider device automatically based on legitimate transaction rules, etc.). The legitimate transaction rules may be used to determine that a transaction is legitimate based on one or more of properties of the transaction data and/or extracted features. In some examples, the legitimate transaction rules include a transaction age rule providing that an initial transaction that was initiated a predetermined period ago (e.g., 3 months or 6 months) and does not have a corresponding reversion transaction is legitimate. In an example, such a legitimate transaction rule is determined based on a refund eligibility period (e.g., 6 months). Because no refund may be provided to an initial transaction with an age of 6 months, that initial transaction became final and thereby is determined to be legitimate. Human review and designation can also be a legitimate transaction rule in various embodiments (e.g. a human reviewer marking a transaction as legitimate).

In some examples, the legitimate transaction rules are based on a trust level of a user of a transaction. For example, a legitimate transaction rule may provide that a reversion transaction by a user (adjuster) with a particular trust level (e.g., high) is legitimate. In some examples, a legitimate transaction rule is based on a reversion amount percentage (e.g., reversion amount/initial transaction amount). For example, a legitimate transaction rule may provide that a reversion transaction is legitimate if the refund amount percentage is less than a predetermined threshold (e.g., 0.0001).

The method 100 may proceed to block 114, where the autoencoder model is trained using the legitimate transactions with the extracted features to generate a trained autoencoder model. Referring to the example of FIG. 3, an autoencoder 300 of a neural network system for anomaly detection is illustrated, according to some embodiments. The autoencoder 300 includes an encoder 302 and a decoder 304, each of the encoder 302 and decoder 304 may be implemented using a neural network model.

The autoencoder 300 may learn to compress an input data $x_i$ 310 (e.g., a legitimate transaction 310) into a latent variable (also referred to as a latent code or a latent representation), denoted as $En(x_i)$ in a latent space 306. In an example, the input transaction 310 may have N attributes (e.g., transaction time, transaction type, payor, payee, transaction history, adjuster, age, refund amount, refund frequency, etc.), and as such, is in an N-dimensional space. The latent space 306 may have M dimensions, where M is less than N. The decoder 304 may uncompress that latent representation $En(x_i)$ into a reconstructed data 314 (denoted as $De(En(x_i))$) that closely matches the input data $x_i$ 310. As such, the autoencoder 300 engages in dimensionality reduction, for example by learning how to ignore the noise. A reconstruction loss function may be used by the loss computation unit 308 of the autoencoder 300 to generate a reconstruction error 312. An exemplary reconstruction loss function is provided as follows:

$$L_{reconstruction} = \frac{1}{n}\sum_{i=1}^{n} \|x_i - De(En(x_i))\|.$$

The autoencoder 300 may be trained (e.g., using backpropagation and gradient descent) to minimize the reconstruction loss function. In one example, the goal of the training process is to learn the identity function of the training dataset with the minimum reconstruction error. Thus, the autoencoder is configured to learn how to reconstruct training data as best as possible. In some embodiments, by training the autoencoder with only the legitimate transactions determined based on legitimate transaction rules and not using all of the historical transactions, the computation time for the training process is reduced.

In various embodiments, the autoencoder 300 is specifically trained to recognize whether a particular reversion transaction (e.g., in view of another reference transaction which is not a reversion transaction) appears to be anomalous—that is, if its characteristic data and other related data seems to be sufficiently far away from known good data of other reversion transactions. Data that can be examined and used to build autoencoder 300 can include provider entity ID+ customer ID pairs (e.g. unique identifier for an authorized user of a payment provider who can issue a reversion transaction and an ID for a customer who does not have such power). Additional feature data relating to a provider entity ID/customer ID for a reversion transaction may also be used—e.g. how many reversion transactions have occurred between a given ID pair; how long a relationship was between a first reversion transaction and a later reversion transaction using the same provider entity ID/customer ID. It may be anomalous, for example, if a same provider entity ID was used to issue four different reversions to the same customer within a month, but using a rules based approach (rather than an autoencoder) might generate many false positives if it was simply based on one factor like this.

In various embodiments, various features extracted at process 110 may be used by the autoencoder 300 during the training. The features may include any and all transaction data, including e.g., transaction time (date, time of day, etc.), a transaction amount, user's average transaction amount, reversion frequency, any suitable features, and/or a combination thereof. In an example, the autoencoder may be trained to learn that while a particular reversion transaction frequency by the same adjustor to the same payor (e.g., four reversion transactions in a month) with a lower transaction amount (e.g., less than $1,000) is associated with a moderate likelihood of fraud (e.g., 40% likelihood), that particular reversion transaction frequency with a higher transaction amount (e.g., greater than $5,000) is associated with a high likelihood of fraud. In another example, the autoencoder may be trained to learn that a higher refund amount percentage (e.g., total refund amount/total transaction amount) corresponds to a higher likelihood of fraud. In an example, a first historical transaction has a higher refund amount percentage (e.g., 1000/160) where the customer receives refunds (e.g., $100, $200, $300, and $400) for four transactions (e.g., with transaction amounts of $ 20, $ 30, $ 50, and $ 60), and a second transaction has a lower refund amount percentage (e.g., 22/160) (e.g., $ 4, $ 5, $ 6, and $ 7) refund for four transactions (e.g., with transaction amounts of $ 20, $ 30, $ 50, and $ 60). The autoencoder may be trained to learn that the first transaction has a higher likelihood of fraud than the second transaction. In another example, the autoencoder may be trained to use various features (e.g., transaction locations, country of sellers, physical location of entity ID/customer ID) in determining the likelihood of fraud.

Figure 4:
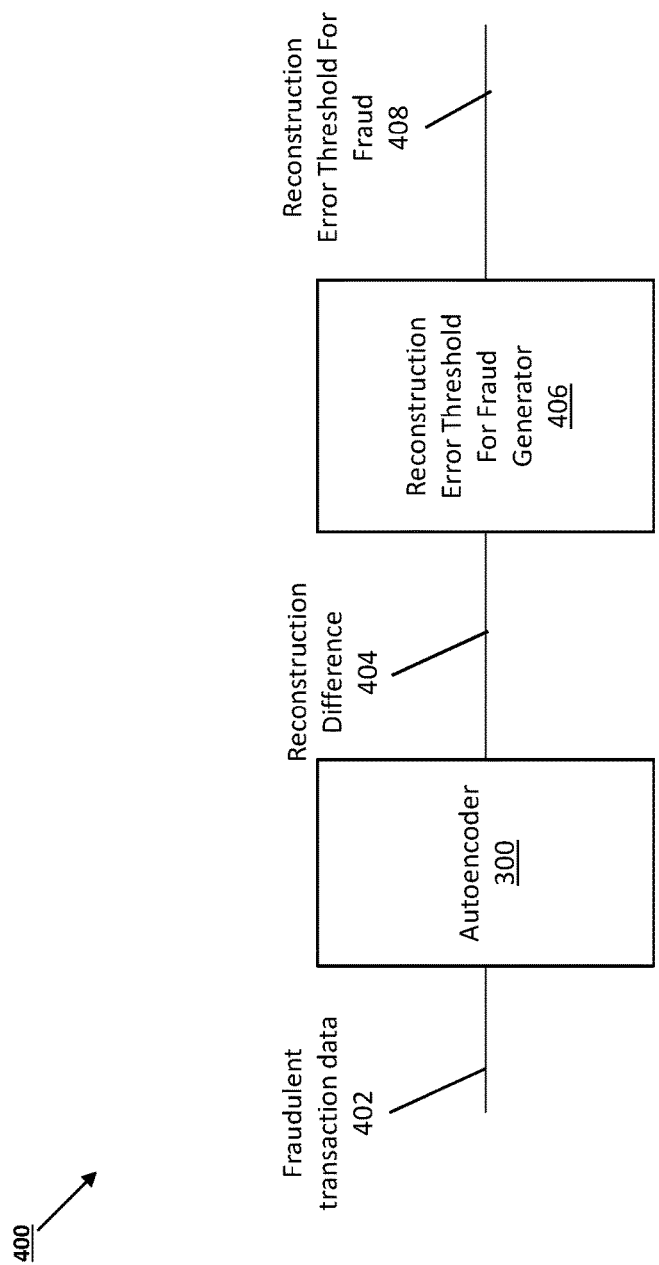
FIG. 4 is a schematic illustrating an anomaly detection system or a portion thereof in accordance with an embodiment.

The method 100 may then proceed to block 116, where a reconstruction difference threshold for anomaly is determined. In the description below, fraud detection is used as an example, and the reconstruction difference threshold for anomaly is also referred to as a reconstruction difference threshold for fraud. In some embodiments, the reconstruction difference threshold for fraud is provided by an operator or retrieved from a storage device. Alternatively, as shown in the example of FIG. 4, a reconstruction difference threshold for fraud may be determined using the trained autoencoder 300. As shown in FIG. 4, the trained autoencoder 300 receives a plurality of fraudulent transaction data 402 of historical transactions (e.g., initial transactions, reversion transactions, combined historical transactions, and/or a combination thereof) that have been labeled as fraudulent. The trained autoencoder generates a reconstruction difference 404 for each fraudulent transaction 402. The reconstruction error threshold for fraud generator 406 receives the plurality of reconstruction difference 404 for fraudulent transactions, and determines a reconstruction error threshold for fraud 408 (e.g., an average of the reconstruction differences 404, a weighted average of the reconstruction differences 404 using weights corresponding to the confidence level of the labeling, etc.).

The method 100 may then proceed to block 118, where a first transaction for anomaly detection is received. Referring to the example of FIG. 5, an anomaly detection system 500 is illustrated. An anomaly detection system provider device 504 may receive a first transaction 510 from a third-party service provider device 502. The first transaction 510 is not in the historical transactions accessed at block 102. The first transaction 510 may be an initial transaction, a reversion transaction, or a combined transaction including sub-transactions (e.g., initial payment transaction, reversion transaction) performed at different times and locations, using different devices, and/or by different users. In some examples, a preprocessing process substantially similar to block 104 may be performed by a preprocessor 512 to the first transaction 510, such that the preprocessed first transaction includes extracted features associated with the trained autoencoder model 300

The method 100 may then proceed to block 120, where an inference process is performed on the trained autoencoder 300 to generate a first reconstructed transaction for the first transaction 510. The trained autoencoder 300 may (e.g., using its loss computation unit 308) compare the first reconstructed transaction and the first transaction 510, and generate a reconstruction difference 514.

Figure 5:
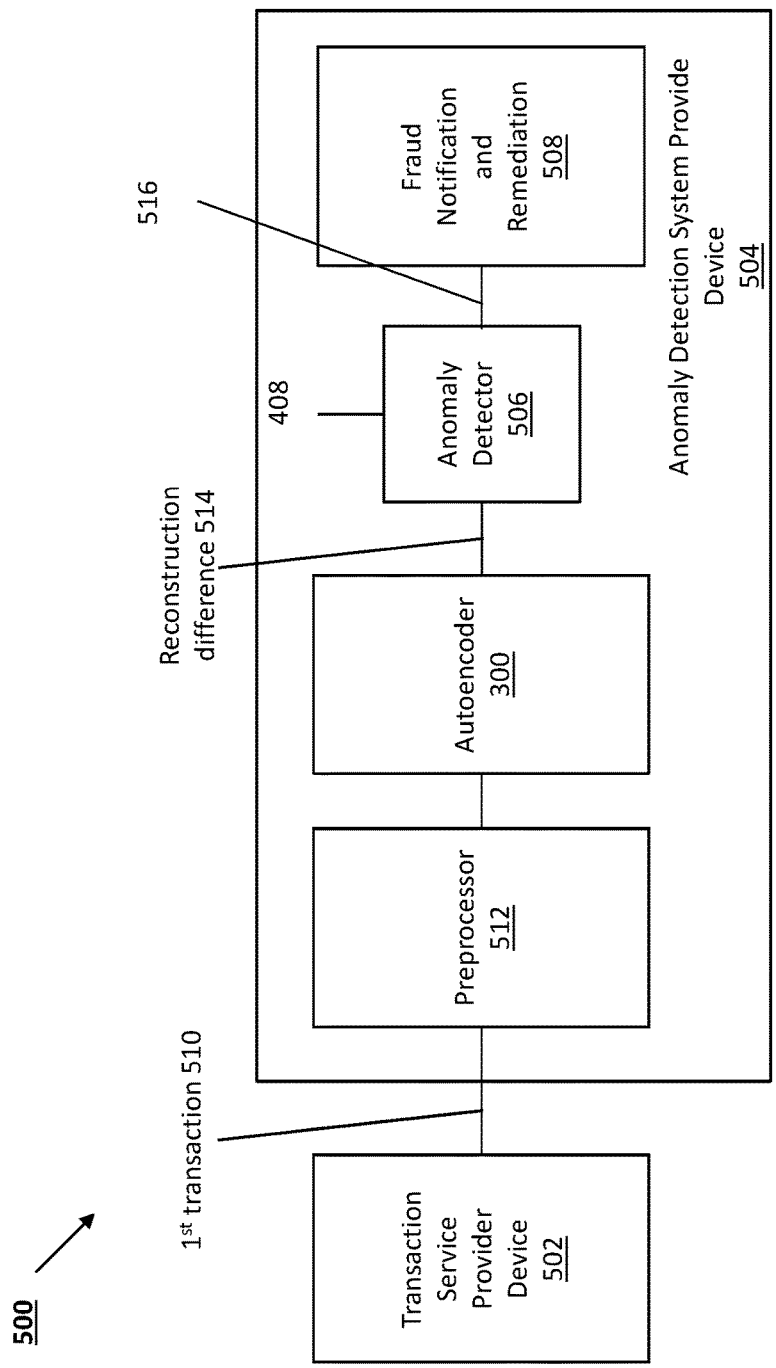
FIG. 5 is a schematic illustrating an anomaly detection system or a portion thereof in accordance with an embodiment.

The method 100 may then proceed to block 122, where the system provider device determines whether the first transaction 510 is fraudulent based on reconstruction difference 514. In various embodiments, because the trained autoencoder 300 has been trained using legitimate transactions, the reconstruction difference 514 may be used to determine whether the first instruction is fraudulent (e.g., with a large reconstruction difference 514) or legitimate (e.g., with a small reconstruction difference 514). In the example of FIG. 5, an anomaly detector 506 receives the reconstruction error threshold for fraud 408 (e.g., from reconstruction error threshold for fraud generator 406) and the reconstruction difference 514 (e.g., from the trained autoencoder 300), and generates a fraud prediction 516 (e.g., a binary value, a probability, etc.) indicating the likelihood that the first transaction 510 is fraudulent.

The method 100 may proceed to block 124, various actions may be performed after it is determined that the first transaction 510 is fraudulent. In an example, a remediation action is performed automatically to the first transaction. In another example, a fraudulent transaction alert may be provided to an operator.

It is noted that while anomaly detection for online transactions (e.g., a payment transaction, transactions for taking an online course, playing computer games, viewing digital content such as news/blogs, shopping) are used as examples for using a neural network system to detect fraud, the method 100 and systems described may be used to improve accuracy and efficiency of the neural network system (e.g., by addressing noisy label problems) for any suitable applications of neural network systems. For example, the described systems and methods may be used in applications for image processing, computer vision, natural language processing, autonomous driving, etc.

Figure 6:
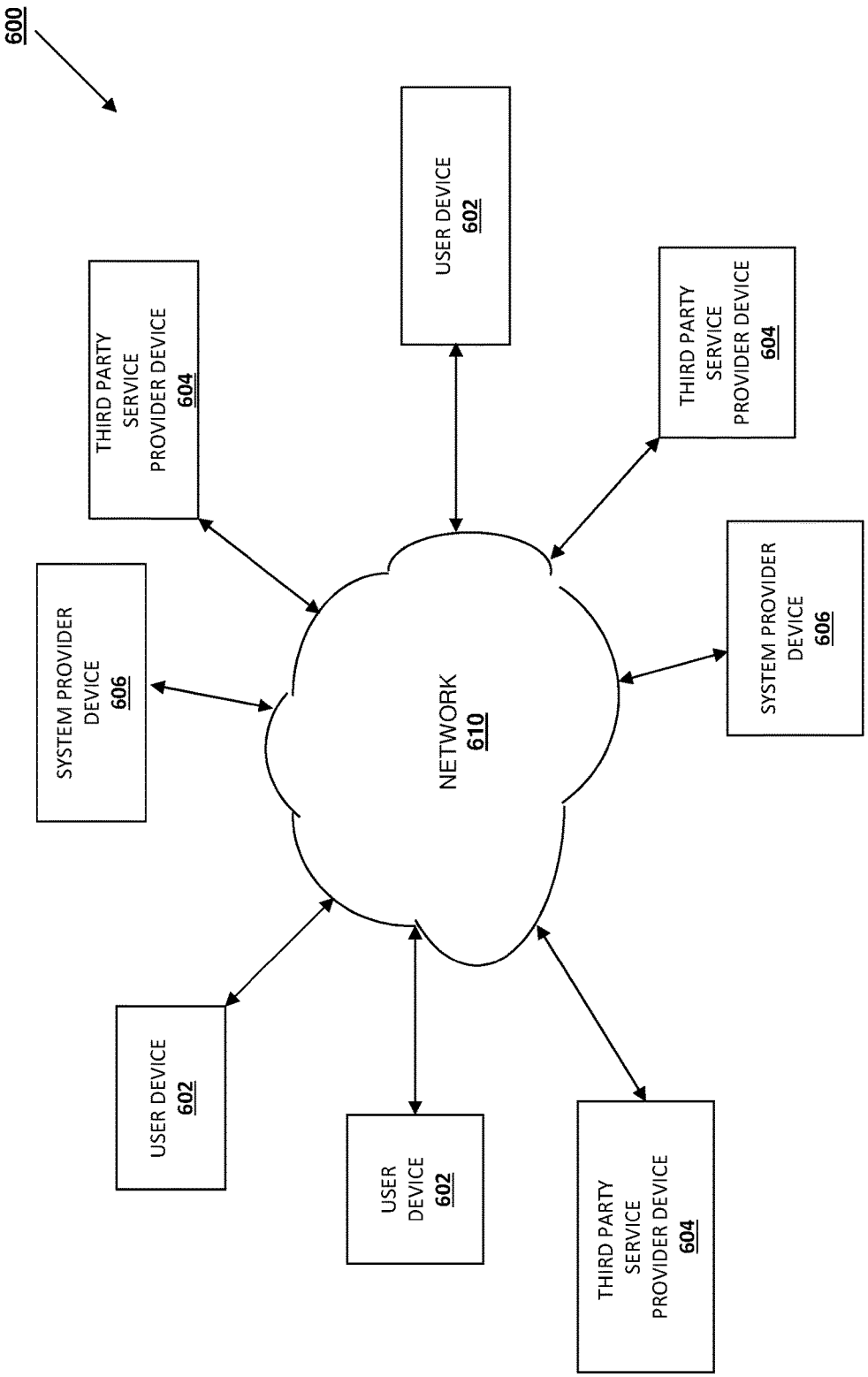
FIG. 6 is a schematic view illustrating an embodiment of a networked system.

Referring now to FIG. 6, an embodiment of a network-based system 600 for implementing one or more processes described herein is illustrated. As shown, network-based system 600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX®

OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 600 illustrated in FIG. 6 includes one or more user devices 602, one or more system provider devices 606, and one or more third-party service provider devices 604 in communication over a network 610. Any of the user devices 602 may be a user device associated with a transaction with a third-party service provider device or a system provider device discussed above. The system provider device 606 may implement the neural network system for anomaly detection (e.g., fraud detection), and may be operated by a system provider such as, for example, PayPal Inc. of San Jose, Calif. The third-party service provider device 604 may be the service provider device providing transaction services with the user device 602 and may be operated by various service providers including payment service providers, discount providers, marketplace providers, and/or any other service providers.

The user devices 602, system provider devices 606, and third-party service provider devices 604 may each include one or more processors, memories, and other appropriate components for executing instructions such as program code and/or data stored on one or more computer readable mediums to implement the various applications, data, and steps described herein. For example, such instructions may be stored in one or more computer-readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The user device 602 may be implemented using any appropriate combination of hardware and/or software configured for wired and/or wireless communication over network 610. For example, in one embodiment, the user device 602 may be implemented as a personal computer of a user in communication with the Internet. In some embodiments, the user device 602 may be a wearable device. In some embodiments, the user device 602 may be a smartphone, personal digital assistant (PDA), laptop computer, and/or other types of computing devices.

The user device 602 may include one or more browser applications which may be used, for example, to provide a convenient interface to permit the customer to browse information available over the network 610. For example, in one embodiment, the browser application may be implemented as a web browser configured to view information available over the Internet.

The user device 602 may also include one or more toolbar applications which may be used, for example, to provide user-side processing for performing desired tasks in response to operations selected by the customer. In one embodiment, the toolbar application may display a user interface in connection with the browser application.

The user device 602 may further include other applications as may be desired in particular embodiments to provide desired features to the user device 602. In particular, the other applications may include an online payment transaction application provided by an online payment transaction provider. The other applications may also include security applications for implementing user-side security features, programmatic user applications for interfacing with appropriate application programming interfaces (APIs) over the network 610, or other types of applications. Email and/or text applications may also be included, which allow the customer to send and receive emails and/or text messages through the network 610. The user device 602 includes one or more user and/or device identifiers which may be implemented, for example, as operating system registry entries, cookies associated with the browser application, identifiers associated with hardware of the user device 602, or other appropriate identifiers, such as a phone number. In one embodiment, the user identifier may be used by the system provider device 606, and/or the third-party service provider device 604 associate the user with a particular account as further described herein.

Figure 7:
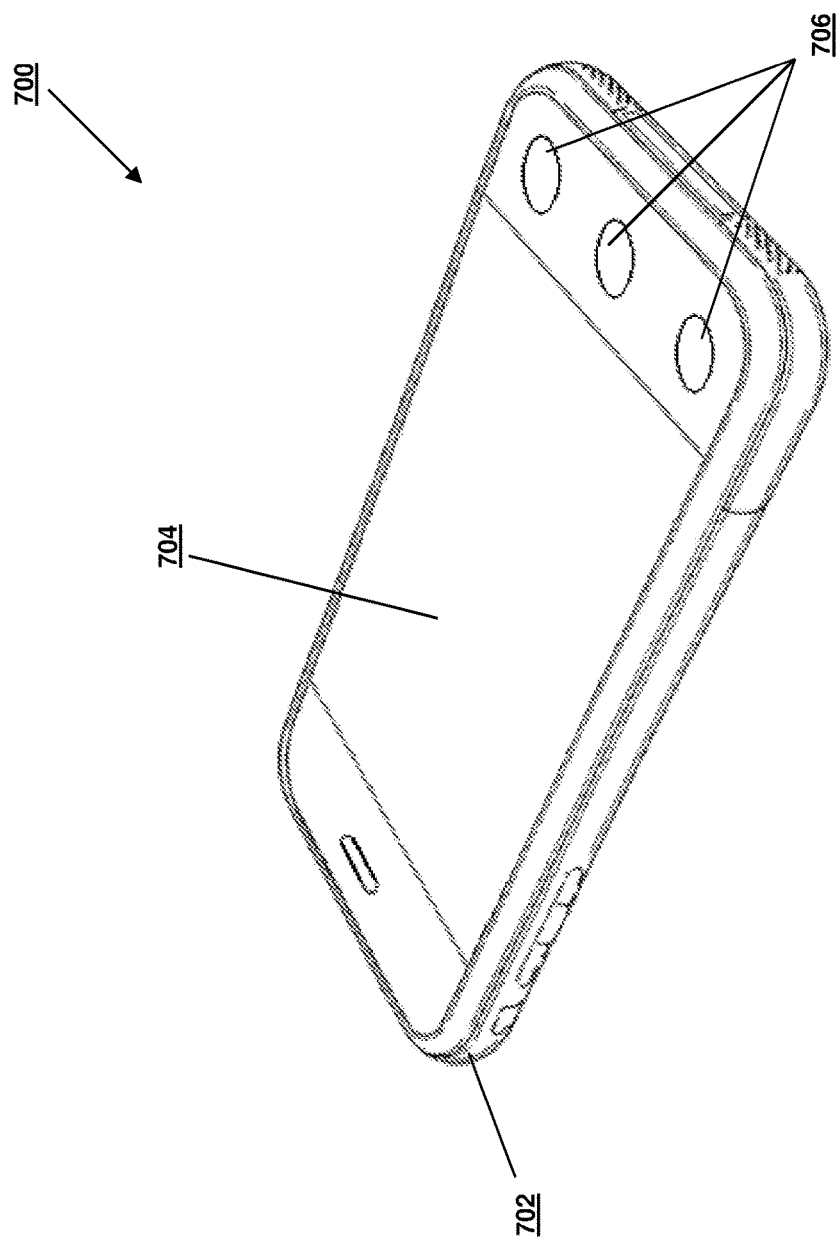
FIG. 7 is a perspective view illustrating an embodiment of a user device.

Referring now to FIG. 7, an embodiment of a user device 700 is illustrated. The user device 700 may be the user devices 602. The user device 700 includes a chassis 702 having a display 704 and an input device including the display 704 and a plurality of input buttons 706. One of skill in the art will recognize that the user device 700 is a portable or mobile phone including a touch screen input device and a plurality of input buttons that allow the functionality discussed above with reference to the method 100. However, a variety of other portable/mobile customer devices may be used in method 100 without departing from the scope of the present disclosure.

Figure 8:
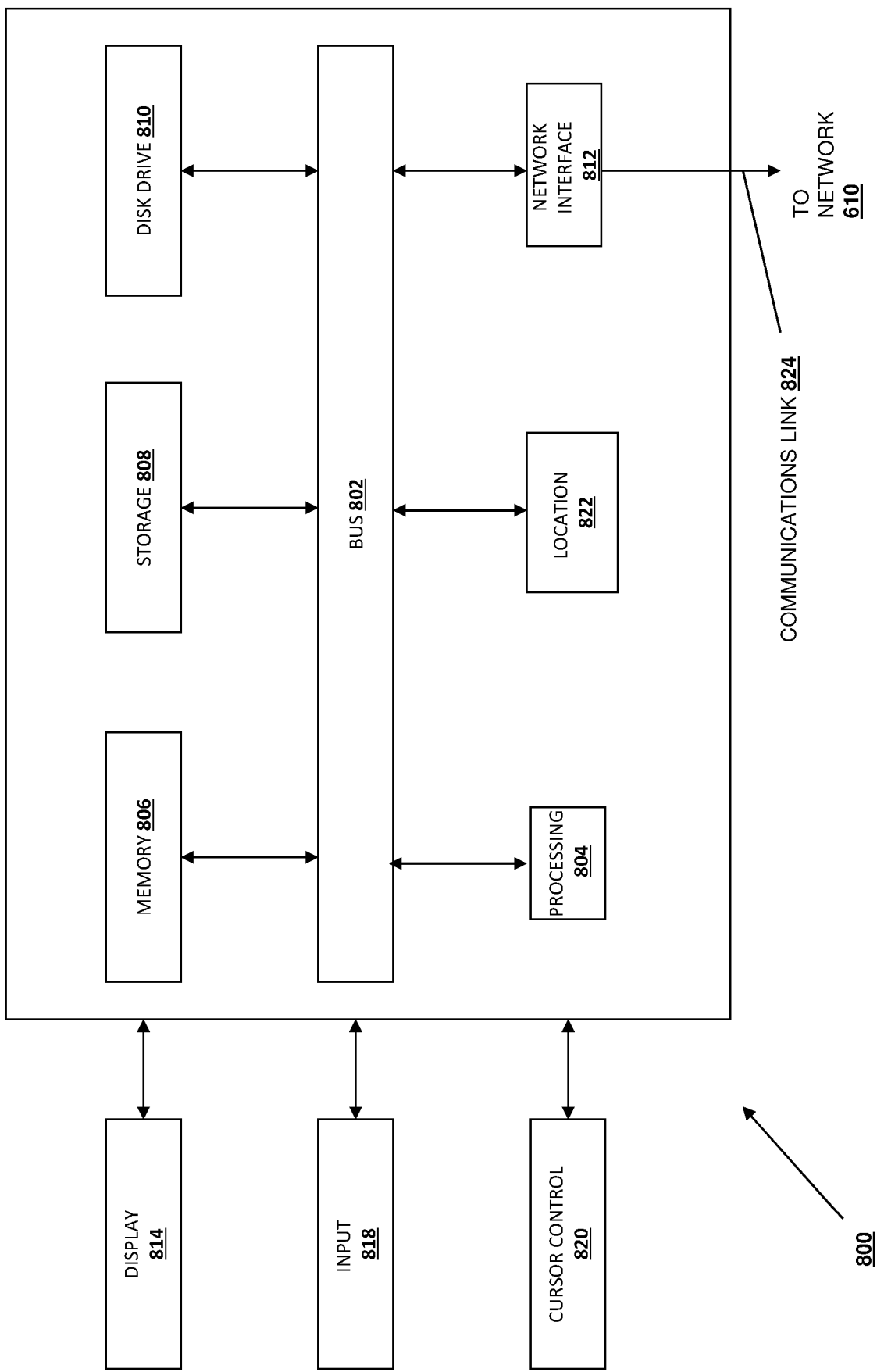
FIG. 8 is a schematic view illustrating an embodiment of a computer system.

Referring now to FIG. 8, an embodiment of a computer system 800 suitable for implementing, for example, user device 602, system provider device 606, and/or third-party service provider device 604 is illustrated. It should be appreciated that other devices utilized by users, system providers, third-party user information providers, third party service providers, and/or system providers in the system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 800 performs specific operations by the processor 804 executing one or more sequences of instructions contained in the memory component 806, such as described herein with respect to the user devices 602, service provider device 606, and/or third-party service provider device 604. Such instructions may be read into the system memory component 806 from another computer-readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
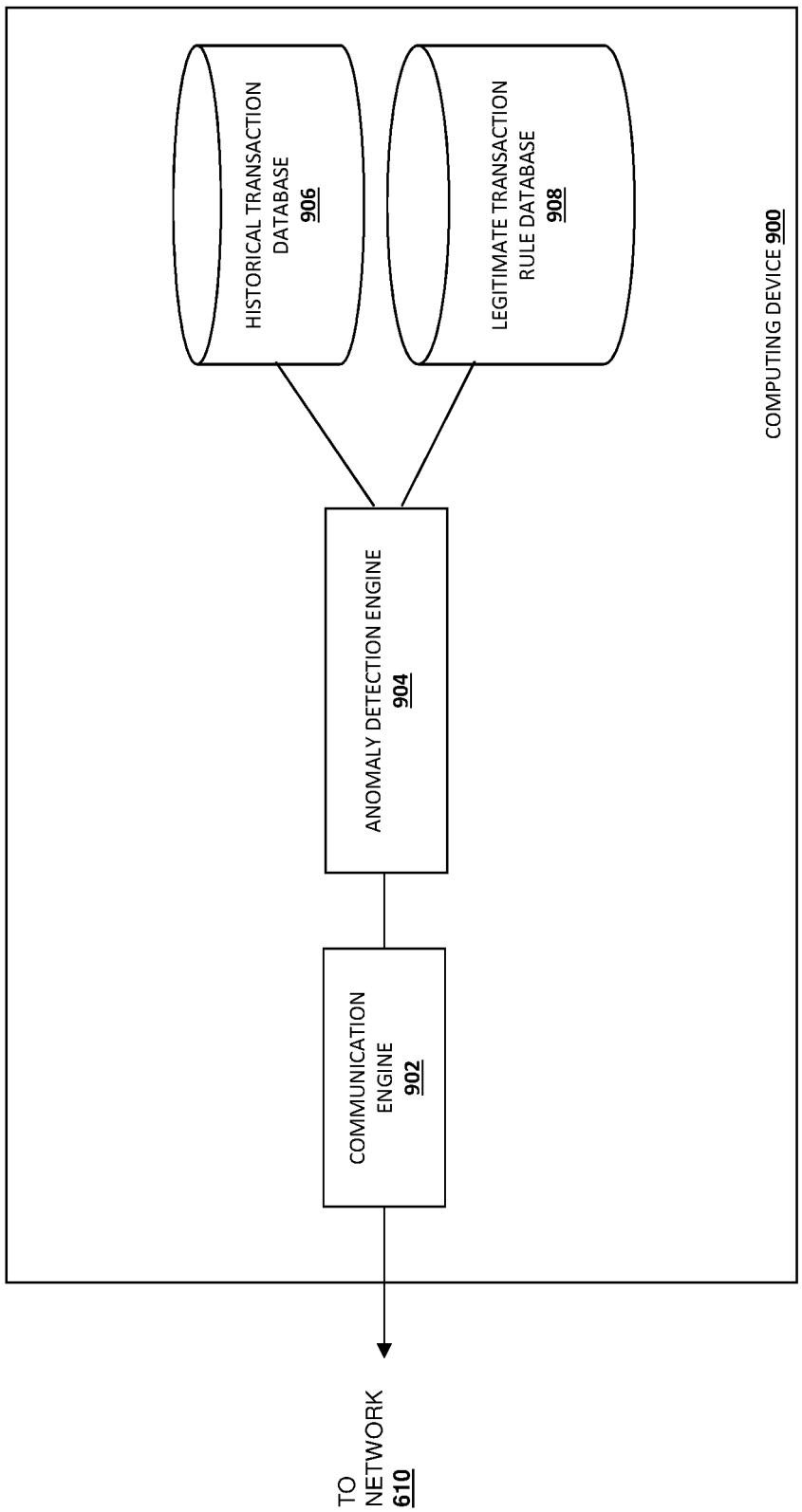
FIG. 9 is a schematic view illustrating an embodiment of a device that may be used as a user device and/or a system provider device.

Referring now to FIG. 9, an embodiment of a device 900 is illustrated. In an embodiment, the device 900 may be a system provider device 606 discussed above. The device 900 includes a communication engine 902 that is coupled to the network 610 and to an anomaly detection engine 904 that is coupled to a historical transaction database 906 (e.g., providing historical transactions including historical reversion transactions) and a legitimate transaction rule database 908. The communication engine 902 may be software or instructions stored on a computer-readable medium that allows the device 900 to send and receive information over the network 610. The anomaly detection engine 904 may be software or instructions stored on a computer-readable medium that is operable to perform operations including accessing first data comprising a plurality of historical reversion transactions; determining a plurality of legitimate transactions from the plurality of historical reversion transactions; training an autoencoder using the plurality of legitimate transactions to generate a trained autoencoder capable of measuring a given transaction for similarity to the plurality of legitimate transactions; generating, by the trained autoencoder, a first reconstructed transaction using a first transaction; and determining that the first transaction is fraudulent based on a reconstruction difference between the first transaction and the first reconstructed transaction. The operations may also provide any of the other functionality that is discussed above. While the databases 906-908 have been illustrated as separate from each other and located in the device 900, one of skill in the art will recognize that any or all of the databases 906-908 may be combined and/or may be connected to the anomaly detection engine 904 through the network 610 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and one or more hardware processors coupled to the non-transitory memory and configured to read instructions from the non-transitory memory to cause the system to perform operations comprising:

accessing first data comprising a plurality of historical reversion transactions;

determining a plurality of legitimate reversion transactions from the plurality of historical reversion transactions based on one or more legitimate transaction rules, wherein the one or more legitimate transaction rules include a transaction user trust level rule for determining that the plurality of legitimate reversion transactions are based on a trust level of a user that performed one or more of the plurality of legitimate reversion transactions;

training an autoencoder using the plurality of legitimate reversion transactions to generate a trained autoencoder capable of measuring a given reversion transaction for similarity to the plurality of legitimate reversion transactions;

generating, by the trained autoencoder, a first reconstructed reversion transaction using a first reversion transaction not included in the plurality of historical reversion transactions; and determining that the first reversion transaction is anomalous based on a reconstruction difference between the first reversion transaction and the first reconstructed reversion transaction.

2. The system of claim 1, wherein the autoencoder is a denoising autoencoder, and wherein the training the autoencoder includes:

generating a corrupted training data of an original training data by adding noise to the original training data; and generating a reconstructed data of the original training data based on the corrupted training data.

3. The system of claim 1, wherein the operations further comprise:

determining a plurality of anomalous transactions from the plurality of historical reversion transactions;

generating, using the trained autoencoder based on the plurality of anomalous transactions, a reconstruction error threshold for anomaly; and determining that the first reversion transaction is anomalous by comparing the reconstruction difference with the reconstruction error threshold for anomaly.

4. The system of claim 1, wherein the autoencoder includes an encoder and a decoder, wherein a trained encoder of the trained autoencoder is configured to receive the first reversion transaction in an N-dimensional data space and generate a latent variable in an M-dimensional latent space, wherein M is an integer less than N, and wherein a trained decoder of the trained autoencoder is configured to generate the first reconstructed reversion transaction using the latent variable.

5. The system of claim 1, wherein the operations further comprise:

preprocessing the plurality of historical reversion transactions to generate a plurality of preprocessed transactions including extracted features for the autoencoder;

wherein the plurality of legitimate reversion transactions for training the autoencoder include the preprocessed transactions.

6. The system of claim 1, wherein each of the plurality of historical reversion transactions comprises at least one of a reversal of a previous transaction or an account credit received in association with the previous transaction.

7. The system of claim 1, wherein the legitimate transaction rules are further associated with at least one of a transaction age rule, a refund eligibility period, or a reversion amount percentage rule.

8. A method, comprising:

providing a plurality of legitimate reversion transactions based on one or more legitimate transaction rules, wherein the one or more legitimate transaction rules include a legitimate transaction rule based on a reversion amount percentage based on a reversion amount over an initial transaction amount associated with a plurality of historical reversion transactions;

training an autoencoder using the plurality of legitimate reversion transactions to generate a trained autoencoder capable of measuring a given reversion transaction for similarity to the plurality of legitimate reversion transactions;

generating, by the trained autoencoder, a first reconstructed reversion transaction using a first reversion transaction not included in the plurality of historical reversion transactions; and determining that the first reversion transaction is anomalous based on a reconstruction difference between the first reversion transaction and the first reconstructed reversion transaction.

9. The method of claim 8, wherein the autoencoder is a denoising autoencoder, and wherein the training the autoencoder includes:

generating a corrupted training data of an original training data by adding noise to the original training data; and generating a reconstructed data of the original training data based on the corrupted training data.

10. The method of claim 8, wherein the autoencoder includes an encoder and a decoder, wherein a trained encoder of the trained autoencoder is configured to receive the first reversion transaction in an N-dimensional data space and generate a latent variable in an M-dimensional latent space, wherein M is an integer less than N, and wherein a trained decoder of the trained autoencoder is configured to generate the first reconstructed reversion transaction using the latent variable.

11. The method of claim 8, wherein the training the autoencoder includes:

preprocessing the plurality of historical reversion transactions to generate a plurality of preprocessed transactions including extracted features for the autoencoder;

wherein the plurality of legitimate reversion transactions for training the autoencoder include the preprocessed transactions.

12. The method of claim 11, wherein the extracted features include one or more correlation features associated with a first user performed an initial transaction associated with a historical reversion transaction of the plurality of historical reversion transactions and a second user performed the historical reversion transaction.

13. The method of claim 8, wherein each of the plurality of historical reversion transactions comprises at least one of a reversal of a previous transaction or an account credit received in association with the previous transaction.

14. The method of claim 8, wherein the legitimate transaction rules are further associated with at least one of a transaction age rule, a refund eligibility period, or a user trust level rule.

15. A non-transitory machine-readable medium having stored thereon machine-readable instructions executable to cause a machine to perform operations comprising:
- accessing first data comprising a plurality of historical reversion transactions including a plurality of legitimate reversion transactions and a plurality of anomalous reversion transactions based on one or more legitimate transaction rules, wherein the one or more legitimate transaction rules include a transaction user trust level rule for determining that the plurality of historical reversion transactions are legitimate based on a trust level of a user that performed one or more of the plurality of historical reversion transactions;
- training an autoencoder using the plurality of legitimate reversion transactions to generate a trained autoencoder without using the plurality of anomalous reversion transactions;
- generating, by the trained autoencoder, a first reconstructed transaction using a first reversion transaction; and
- determining that the first reversion transaction is anomalous based on a reconstruction difference between the first reversion transaction and the first reconstructed transaction.

16. The non-transitory machine-readable medium of claim 15, wherein the operations further comprise:
- determining that the first reversion transaction is anomalous by comparing the reconstruction difference with a reconstruction error threshold for anomaly.

17. The non-transitory machine-readable medium of claim 16, wherein the operations further comprise:
- generating, using the trained autoencoder based on the plurality of anomalous reversion transactions, the reconstruction error threshold for anomaly.

18. The non-transitory machine-readable medium of claim 15, wherein the training the autoencoder includes:
- preprocessing the plurality of historical reversion transactions to generate a plurality of preprocessed transactions including extracted features for the autoencoder.

19. The non-transitory machine-readable medium of claim 18, wherein the plurality of legitimate reversion transactions for training the autoencoder are determined using the preprocessed transactions.

20. The non-transitory machine-readable medium of claim 19, wherein the preprocessing the plurality of historical reversion transactions includes:
- combining a first sub-transaction including an initial transaction performed by a first user and a second sub-transaction including a reversion transaction performed by a second user to generate a combined historical reversion transaction; and
- extracting features of the combined historical reversion transaction to generate a preprocessed combined historical reversion transaction.

* * * * *